(12) United States Patent
Price et al.

(10) Patent No.: US 8,347,325 B2
(45) Date of Patent: Jan. 1, 2013

(54) SYSTEM, METHOD AND APPARATUS FOR VIEWER DETECTION AND ACTION

(75) Inventors: William Pat Price, Rhome, TX (US); Peter Jay Schwartz, Fullerton, CA (US); Marcus P. Apitz, Yorba Linda, CA (US)

(73) Assignee: Vizio, Inc., Irvine, CA (US)

( * ) Notice: Subject to any disclaimer, the term of this patent is extended or adjusted under 35 U.S.C. 154(b) by 354 days.

(21) Appl. No.: 12/645,371

(22) Filed: Dec. 22, 2009

(65) Prior Publication Data

US 2011/0154385 A1 Jun. 23, 2011

(51) Int. Cl.
*H04H 60/56* (2008.01)
(52) U.S. Cl. ............... 725/12; 725/10; 725/18; 725/25
(58) Field of Classification Search ............ 725/10, 725/12, 18, 25
See application file for complete search history.

(56) References Cited

U.S. PATENT DOCUMENTS

| | | | |
|---|---|---|---|
| 6,721,954 B1* | 4/2004 | Nickum | 725/46 |
| 7,565,671 B1* | 7/2009 | Ritter et al. | 725/10 |
| 7,813,822 B1* | 10/2010 | Hoffberg | 700/94 |
| 8,103,244 B2* | 1/2012 | Tran et al. | 455/406 |
| 2002/0144259 A1* | 10/2002 | Gutta et al. | 725/10 |
| 2002/0194586 A1* | 12/2002 | Gutta et al. | 725/10 |
| 2003/0005431 A1* | 1/2003 | Shinohara | 725/12 |
| 2006/0031905 A1* | 2/2006 | Kwon | 725/108 |
| 2006/0197676 A1* | 9/2006 | Smith | 340/825.69 |
| 2008/0316372 A1* | 12/2008 | Xu et al. | 348/739 |
| 2009/0059090 A1* | 3/2009 | Fan et al. | 348/734 |
| 2010/0050002 A1* | 2/2010 | Huang | 713/310 |

\* cited by examiner

*Primary Examiner* — Pankaj Kumar
*Assistant Examiner* — Sahar Baig
(74) *Attorney, Agent, or Firm* — Law Office of Scott C. Harris, Inc.

(57) ABSTRACT

An application for a television has a detector capable of determining the identity and/or presence of at least one viewer in a viewing area of the television. In response to viewers entering and leaving the viewing area of the television, the television adjusts its operation based upon settings for the currently present viewers (e.g., enables channels, content, etc).

25 Claims, 8 Drawing Sheets

SYSTEM, METHOD AND APPARATUS FOR VIEWER DETECTION AND ACTION

FIELD

This invention relates to the field of television devices and more particularly to a system for detecting a particular viewer and taking action based upon such.

BACKGROUND

Television devices such as LCD or Plasma televisions reproduce a wide range of content for people of all ages, backgrounds, beliefs, nationalities, ethnics, religions, etc. There are times when certain content reproduced by the television is appropriate for one viewer, while being inappropriate for a second viewer because of the second viewer's age, background, belief, nationality, ethnic culture, religion, etc.

Previously, steps have been taken to limit or preclude presentation of certain content that is deemed inappropriate to a set or subset of viewers. Most content such as music and video (e.g., movies and television programs) is encoded with a decimal value representing a rating of the content. The broadcast industry includes a set of voluntary ratings with values for TV-Y (all children), TV-Y7 (older children), TV-Y7FV (older children, fantasy & violence), TV G (general audience), TV-PG (parental guidance), TV-14 (patents strongly cautioned), TV-MA (mature audiences), etc. A security device is included within all televisions of 13" or greater produced after Jan. 1, 2000. This device provides a pin-protected (password) way for a parent to disable certain content from being accessed by a viewer (e.g., child). To make this work, each program is encoded according to their rating on line 21 of the broadcast signal's vertical blanking interval using the Extended Data Services (XDS) protocol, and this rating is detected by the television set's V-chip. If the rating is outside the level configured as acceptable, the program is blocked. News or sports casts do not currently have ratings.

In a similar way, most set-top boxes have their own parental controls integrated into the set-top box. For example, DirectTV has parental controls that allow viewing based on MPAA ratings, block specific movies or even lock out entire channels. Such mechanisms either use the voluntary ratings as described above or, for movies, the MPAA movie ratings of G (general audience), PG (parental guidance suggested), PG-13 (inappropriate for under 13), R (under 17 requires an adult) and NC-17 (no one under 17), etc. Ratings such as this are often encoded into broadcast movies as well as movies provided on media such as disk (DVD, Blueray).

Other methods of categorizing content and encoding the category with the content are known as well as hardware/software analysis of the content to determine levels of appropriateness. For example, speech recognition is used on the audio track to detect a list of inappropriate words for a certain audience or video is analyzed for certain content such as detection of a high percentage of flesh tones or detection of certain anatomical features indicating nudity that, to some, is inappropriate. This too is useful in preventing the delivery of inappropriate content to a set or subset of viewers.

The above techniques are useful when all viewers of a particular television are homogeneous, in that, they all share the same age category (e.g., all are adult), belief system, religion, etc. The above techniques become difficult to manage when only a subset of viewers is of a certain age, belief system, religion, etc.

The biggest issue is in a household of non-homogeneous viewers, such as when there are young children, possibly older children and adults. Each time an adult wishes to view content that is inappropriate for the children, the adult must unlock the parental controls/v-chip and then, remember to relock the parental controls/v-chip when finished. This alone leads to a lack of use due to the constant hassle required to enable/disable these controls. Furthermore, this does not preclude the unintended viewer from intruding on an intended viewer while the intended viewer is enjoying content that is inappropriate for the unintended viewer. For example, if adults are viewing violent or erotic content and their young child awakens and walks into the room where such viewing is being done.

What is needed is a television system that will monitor viewers present in a room and adjust settings based upon those viewers.

SUMMARY

The present invention includes a television with a detector capable of determining the identity and presence of at least one viewer. In response to viewers entering and leaving the viewing area of the television, the television adjusts its operation based upon settings for the currently present viewers.

In one embodiment, a system for monitoring viewers of a television is disclosed including a display panel with a processing element coupled to the display panel. There are a plurality of records, each record being associated with an individual viewer and each record including a viewer identity and a viewer category. A viewer sensing device is coupled to the processing element and software running on the processing element is configured to detect one viewer within a viewing area of the television and to provide content to the display panel appropriate to the viewer category of the one viewer.

In another embodiment, a system for monitoring viewers of a television is disclosed including a display panel with a processing element operatively coupled to the display panel. A plurality of records is provided, each record being associated with an individual viewer and each record including a viewer identity and a viewer time category. A viewer sensing device is coupled to the processing element and software running on the processing element is configured to detect one viewer within a viewing area of the television and to provide content to the display panel based upon the viewer time category.

In another embodiment, a method of monitoring viewers of a television is disclosed including providing a plurality of records, each record associated with an individual viewer and each record comprising a viewer identity and a viewer category. One viewer is detected within a viewing area of the television using the viewer identity and the appropriateness of a current content being provided by the television is determined for the one viewer using the viewer category. If the current content being provided by the television is not appropriate for the one viewer, the current content being provided by the television is disabled.

In another embodiment, a method of monitoring viewers of a television is disclosed including (a) providing a record associated with a viewer comprising a viewer identity, a viewer time limit and a viewer total time then (b) detecting if the viewer is within a viewing area of the television using the viewer identity. The (c) time of the detecting is recorded. (d) An elapsed viewing time is determined by subtracting the current time from the time of the detecting. If (e) the elapsed viewing time plus the viewer total time exceeds the viewer time limit, the current content being provided by the television is disabled. If (f) the viewer is still within the viewing area of the television, continuing with step d. If (g) the viewer is not still within the viewing area of the television, creating a new total time by adding the viewer total time to the elapsed time and saving the new total time in the viewer total time.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
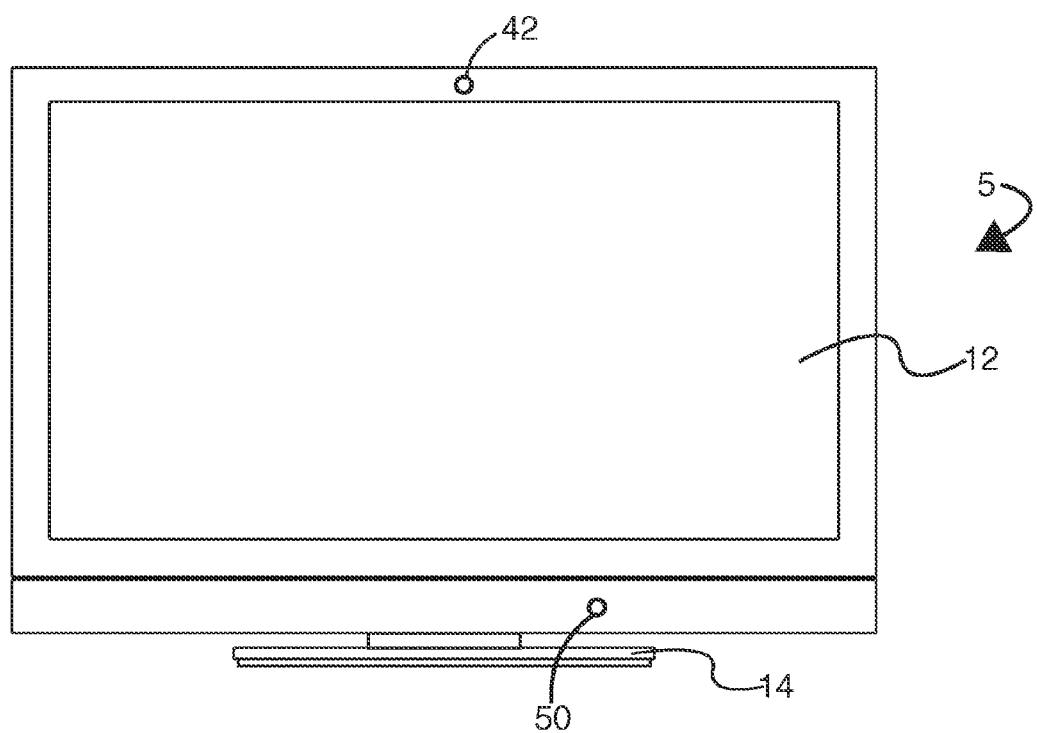
FIG. 1 illustrates a plan view of a television.

Reference will now be made in detail to the presently preferred embodiments of the invention, examples of which are illustrated in the accompanying drawings. Throughout the following detailed description, the same reference numerals refer to the same elements in all figures. The bezel of the present invention is the facing surface surrounding an image producing surface such as an LCD panel, CRT, Plasma panel, OLED panel and the like.

Referring to FIG. 1, a plan view of a television 5 will be described. Typically, a bezel 10 is situated around the peripheral edge of the display panel 12. For completeness, though not required in the present invention, the television is shown on a stand 14.

In this example, a camera 42 and a microphone 50 are integrated into the bezel 10. The present invention uses audio from the microphone 50 and/or image data from the camera 42 to determine a set of current viewers. The location, size and visibility of the camera 42 and/or microphone 50 are for example and any possible location and or combination is anticipated. In some embodiments only the camera 42 is present while in some embodiments, only the microphone 50 is present. In some embodiments, multiple cameras 42 and/or microphones 50 are present. There is no requirement to mount the camera 42 and/or microphone 50 on any specific surface of the television 5. It is fully anticipated that, in some embodiments, the camera 42 and/or microphone 50 are external devices. The only requirement is that the camera 42 and/or microphone 50 are positioned such that camera 42 and/or microphone 50 have access to visual and/or audible information from the viewers of the television 5.

Figure 2:
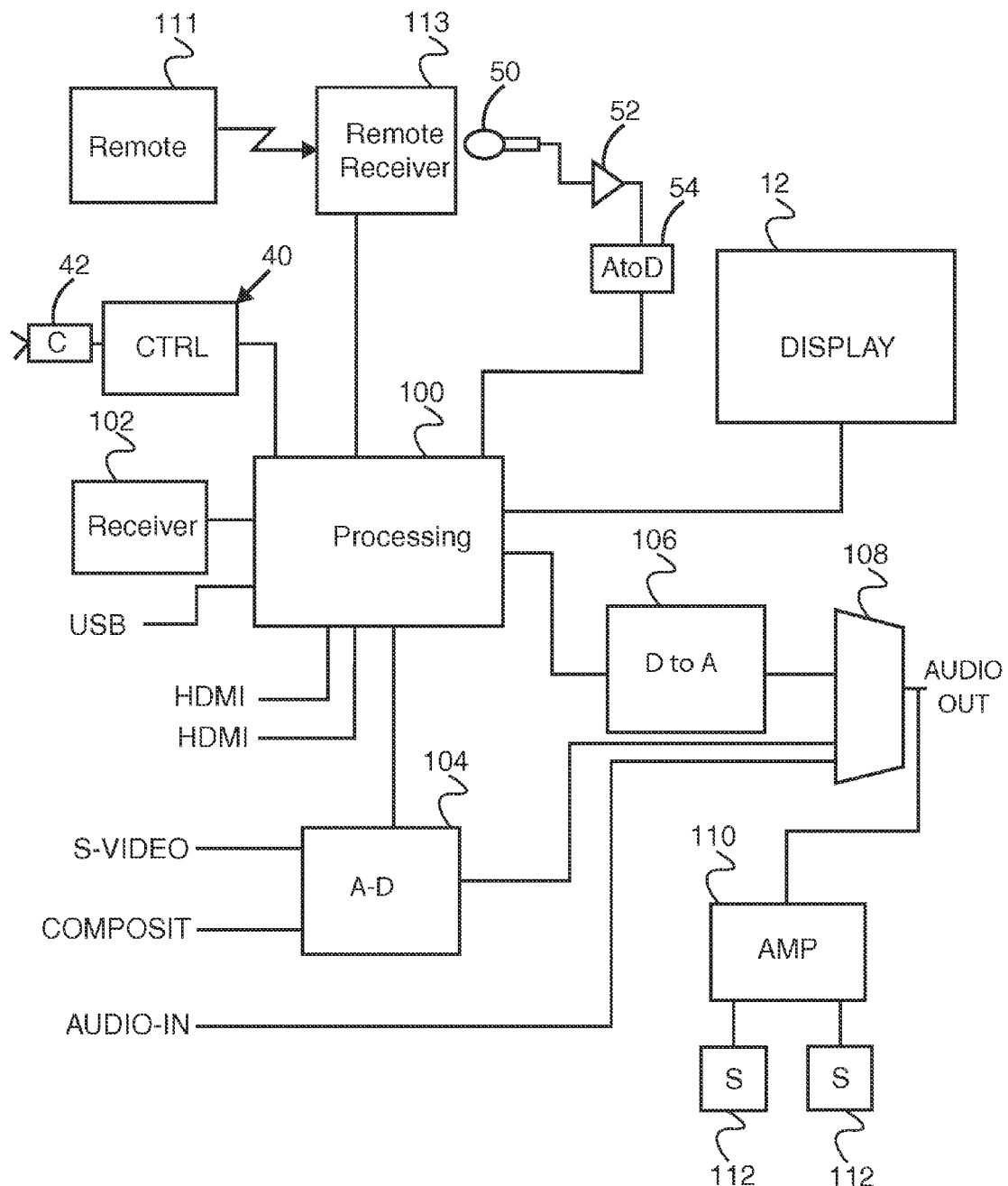
FIG. 2 illustrates a schematic view of a typical television.

Referring to FIG. 2, a schematic view of a typical television will be described. This figure is intended as a representative schematic of a typical television 5 and in practice, some elements are not present in some monitors/televisions 5 and/or additional elements are present in some monitors/televisions 5. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High Definition Multimedia Interfaces (HDMI), USB ports and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 112.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

The processing element is interfaced to a camera element 42 through a camera controller 40. Interfacing of a camera element 42 through a camera controller 40 is well known. For example, it is well known to interface a charge coupled device (CCD) with electronics that scans the charge coupled device into an image. All possible configurations of motion and still image sensors 42 and controllers 40 are included here within. In some embodiments, it is anticipated that some of the control functionality is integrated into the processing element 100 and in some such embodiments, the controller 40 is eliminated.

The processing element is also interfaced to a microphone 50 through an optional pre-amplifier 52 and an analog to digital converter 54. Interfacing of a microphone 50 through an analog to digital converter 54 is well known. Microphones 50 receive vibrations from sound and convert the vibrations into analog electrical signals. The pre-amplifier 52 increases the amplitude of the electrical signals and the analog to digital converter 54 converts the analog electrical signals into digital form for processing by the processing element 100.

Figure 3:
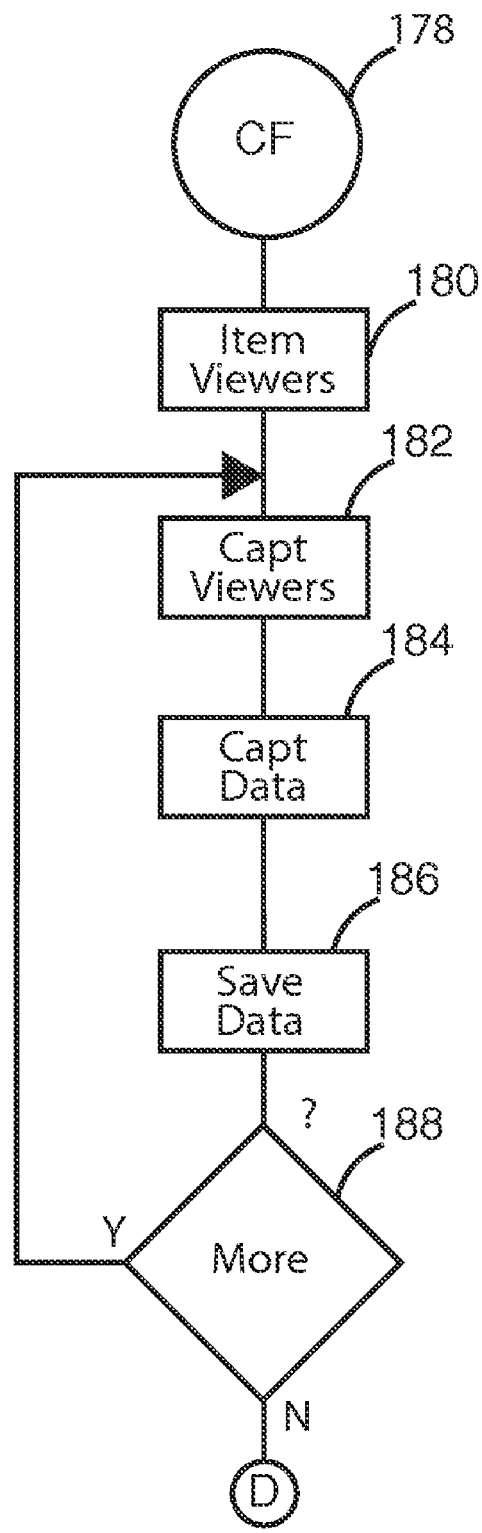
FIG. 3 illustrates a first flow chart.

Referring to FIG. 3, a first flow chart will be described. This is an exemplary program flow executed within the processing element 100 upon the viewer detection system being configured 178. An example of such configuration is a user/viewer directing the processing element 100 to start the viewer configuration through the remote control 111. Once started, the viewer configuration determines the list of viewers 180 (new or update). This is preferably accomplished through an on-screen user interface in which each viewer is entered by name or other identifier. It is anticipated that, in some embodiments, other information is entered regarding each viewer such as age or other categorization data (e.g., religion, sex, beliefs). In some embodiments, settings per viewer are entered such as viewing time permitted per week, viewing time permitted before 8 PM on school days, allowable viewing time periods (e.g., from 7 AM to 8 AM, 3:30 PM to 5 PM and 9 PM to 10 PM on weekdays), etc.

Next, for each viewer, identification information is captured 184, categorization information is entered 186 (if not entered in step 180) and the viewer identification, identification information and categorization information is saved 186. In the step in which identification information is captured 184, in some embodiments, one or more images are captured while in some embodiments one or more audio samples are captured while in some embodiments, both images and audio samples are captured. These images and/or audio samples are later used to determine the viewing audience of the television 5.

Figure 4:
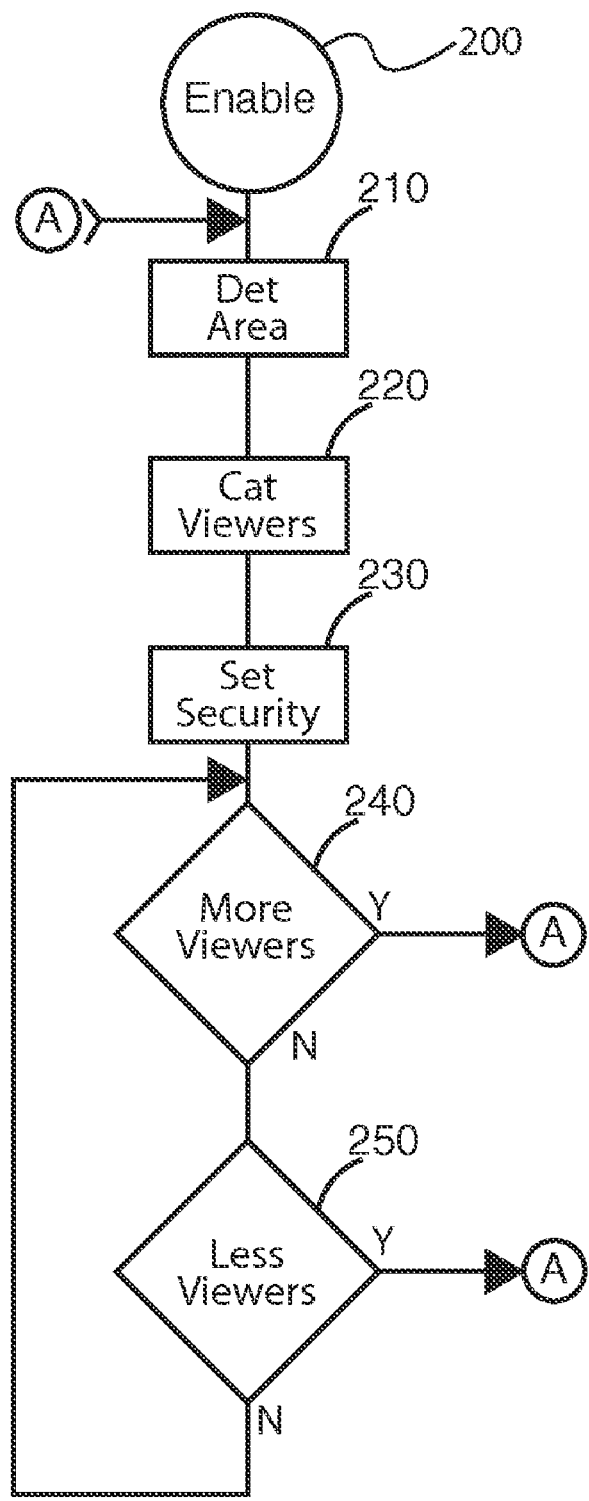
FIG. 4 illustrates a second flow chart.

Referring to FIG. 4, a second flow chart will be described. This is an exemplary program flow executed within the processing element 100 upon the viewer detection system being enabled. An example of such enablement is a user/viewer directing the processing element 100 to enable the viewer detection system through the remote control 111. Once enabled, the viewer detection system determines which viewers are in the area 210. This is done using the camera 42 and/or the microphone 50. An image of the viewing area is captured using the camera 42 and/or an audio sample is taken using the microphone 50. The image(s) and/or audio sample are compared to the saved categorization information which has image(s) and/or audio samples for each potential viewer to determine a list of viewers currently present 210.

It is well known to use image recognition in conjunction with one or more stored images (or image descriptions—e.g., facial features, etc) to determine if any of the faces in the stored images is present in a captured image. This type of software is used, for example, in airport security systems in which a collection of images are maintained regarding criminal or terrorist suspects and images captured at various airport locations are facially compared to each image in the collection to determine if the suspect is present in the airport. For some embodiments, the image recognition is performed by the processor or processing element 100 within the television 5 while in other embodiments, some or all of the computational work is offloaded to a remote server when the television 5 is, for example, connected to the Internet. As an example, when a new person enters the room, an image of the person is captured and the processing element 100 performs a quick comparison to determine an identity of the person. If the processing element 100 has a high degree of uncertainty as to the identity of the person, then the image is uploaded to a server (not shown) and the server performs further calculations to determine the identity of the person.

Next, a category is determined 220 based upon a merging algorithm of the viewers currently present. There are many anticipated merging algorithms, the preferred being to determine the least common denominator for the viewers currently present. For example, if there are two viewers currently present and one is of the age category of 3-7 and the other is of the age category of 12-19, then the age category of 3-7 is used and further steps limit the viewing of content to the age category 3-7. Similarly, if a child of age 12 recently entered the viewing area and was detected 210 and cataloged 220 and previously, only adults were in the area, the age category is set to one related to the 12-year old viewer and, if perhaps adult content is currently being viewed, the security level is set 230 to, for example, TV-G and the presentation of the adult content is disrupted, blanked, disabled, a channel is changed, or other evasive action is taken by the processing element 100. The category, once determined, is used to set the security 230. In this, once set, the content reproduced by the television 5 is limited by rules related to the category. For example, if the category is TV-G, then no content suitable for only adult or TV-MA or TV-14 is permitted. In such, in some embodiments, channels containing this content are blocked and/or hidden and if the content emanates from an external source, that source is blocked, inhibited or access is prevented.

Once the category is set 230, the viewing area is continuously monitored to determine if more viewers have entered the viewing area 240 (someone else entered) or if less viewers are in the viewing area 250 (someone leaves). In either case, the above process is repeated to re-determine which viewers are in the viewing area and set the appropriate security level.

Figure 5:
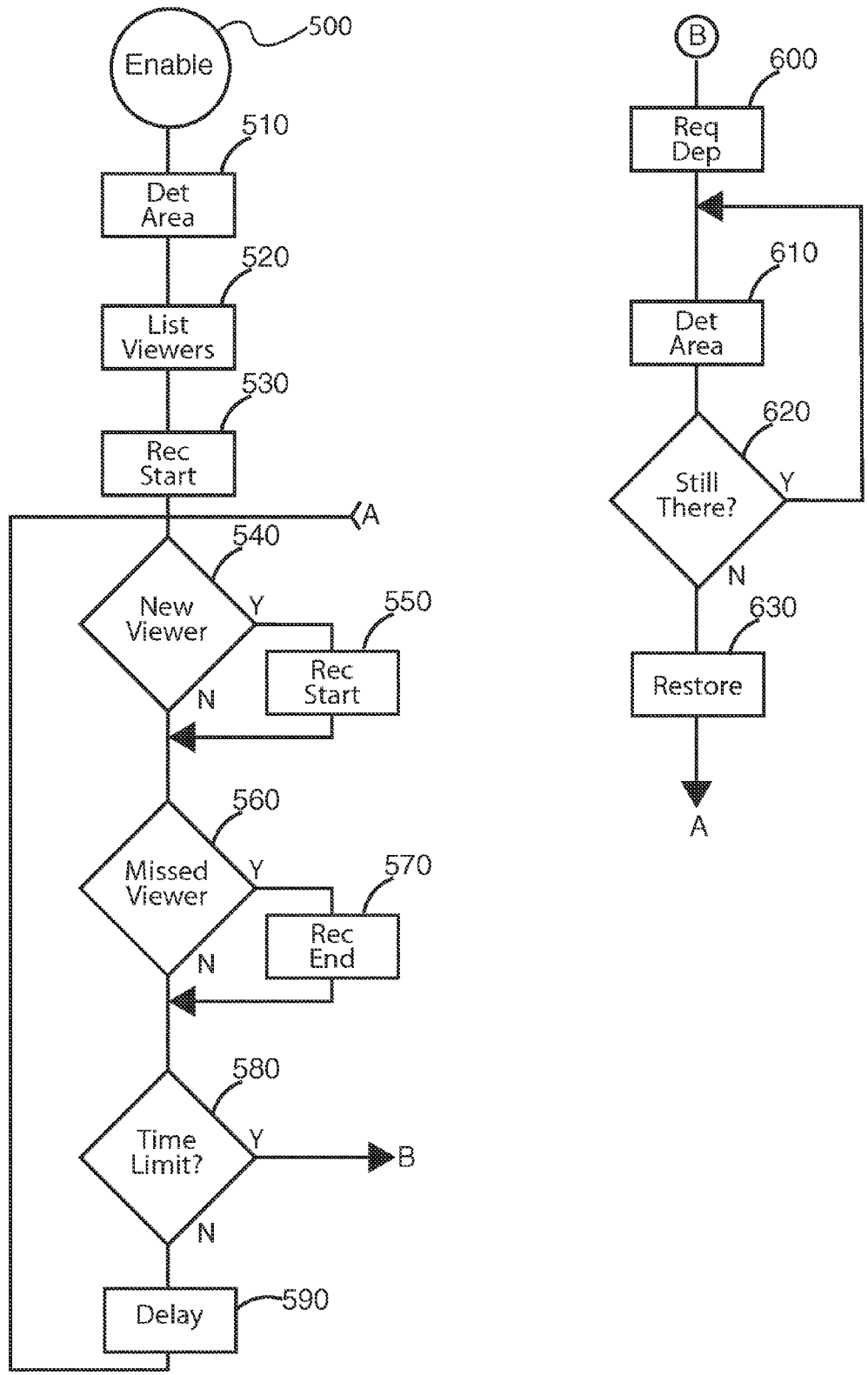
FIG. 5 illustrates a third flow chart.

Referring to FIG. 5, a third chart of the present invention will be described. This is an exemplary program flow executed within the processing element 100 when the system of the present invention is enabled 500 to restrict viewing based upon criteria such as time limits. For example, there are one or more minor viewers and each minor viewer has a certain amount of time that they are allowed to watch the television 5 each day or week. It is anticipated that there are many combinations of restrictions that are possible once a viewer is recognized, including restricting the amount of time a certain channel is viewed, restricting the amount of time a certain input is viewed (e.g., game console input), restricting the times at which certain channel is viewable, restricting the amount of time per period a certain viewer can use the television 5 and/or view a certain channel, etc. The flow charts of the present invention are provided to show how such features are possible given the recognition capabilities of the present invention. Once skilled in the art will easily see and determine many methods are available to implement many other scenarios of restrictions based upon viewer recognition, all of which are included here within.

The example shown in FIG. 5 is that of measuring the amount of time each viewer has spent viewing content on the television 5 and, when a time limit has been exceeded, preventing that user from viewing further content. The viewers in the viewing area are determined 510 and a list of such is created 520 and a record is kept 530 of the time each of the viewers started watching the television 5. Next, in a loop, it is determined if a new viewer has entered the viewing area 540 and if so, a record is kept 550 of when that viewer started viewing content on the television 5. It is also determined if a viewer has exited the viewing area 560 and if so, the current time and the record of when that viewer started viewing content on the television 5 are differentiated 570 to determine how much time the user has spent in front of the television. In some embodiments, this amount of time is added or appended to a record saved for that viewer e.g., a report to a parent) and the total amount of time per period (e.g., per week) is maintained.

Next for each current viewer, it is determined if any user has exceeded their allotted time per time period 580 (e.g., a particular current viewer has exceeded the amount of time they are allowed to view the television 5 for the current week). If no current viewer has exceeded their limit 580, then, optionally, a delay is taken 590 (as known in the industry) and the loop repeated.

If any of the current viewer has exceeded their limit 580, then, the television content is blanked, paused, filtered, disabled, etc., and a request is made for them to stop viewing (e.g., depart the room) 600. For example, an audio message is played telling them that their allotted time for the current week has expired and they are no longer allowed to watch the television 5, or a message is displayed with their name and a message telling them of such, etc. Next, it is determined which viewers are within the viewing area 610 and this is checked to determine if that particular viewer has left the viewing area 620. If that particular user has not left the viewing area, then the area is re-scanned 610 and checked again 620 until that particular viewer is determined to have left the viewing area 620, at which time the television content is restored 630 for the viewing of any remaining viewers (if that was the only viewer, it is anticipated that the television 5 will automatically enter a standby mode).

In an example of this method, if two viewers are watching the television 5 and the first viewer has only 15 minutes left of their weekly allotment of viewing time, when those 15 minutes expire, the television content is disabled (blanked, etc) and the first viewer is asked to stop viewing. Once it is determined that the first viewer has left the viewing area, the television content is restarted for the second viewer to enjoy.

In another example, if there is only one viewer watching the television 5 and has only 15 minutes left of their weekly allotment of viewing time, when those 15 minutes expire, the television content is disabled (blanked, etc) and the viewer is told their weekly allotment of time has expired (audibly or visually). After the viewer has had time to see and/or hear the message, since there are no other viewers in the viewing area, the television 5 enters a standby state.

Figure 6:
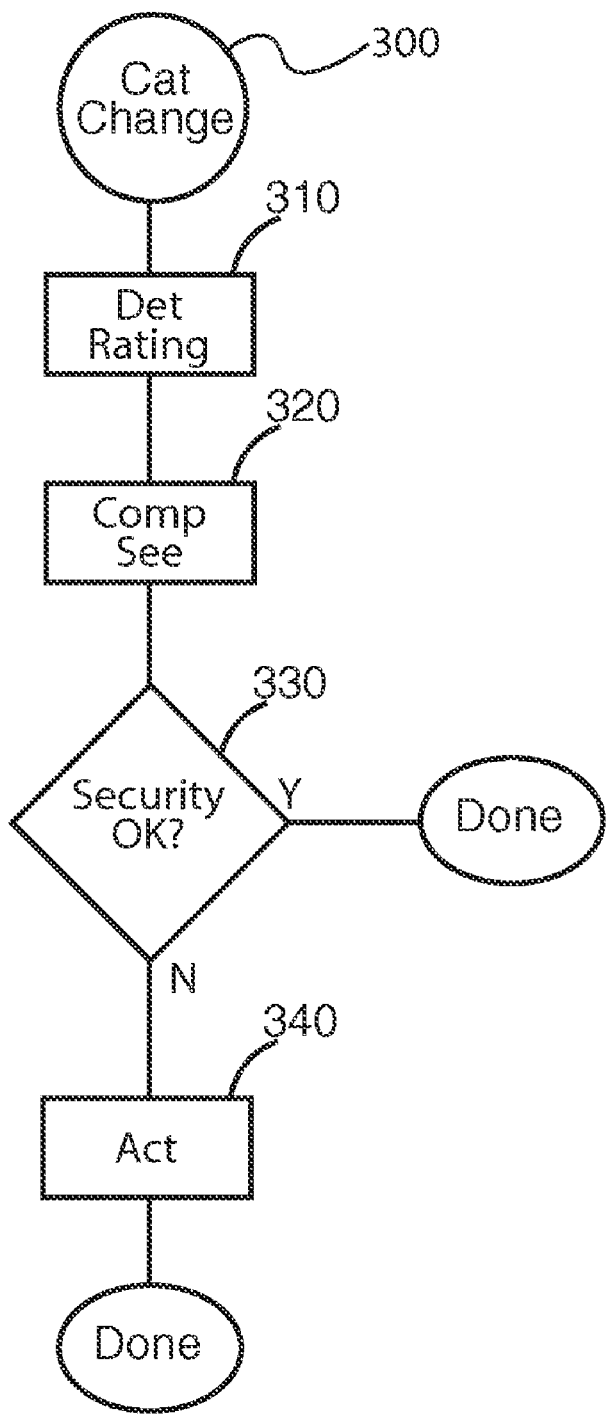
FIG. 6 illustrates a fourth flow chart.

Referring to FIG. 6, a fourth flow chart will be described. This is an exemplary program flow executed within the processing element 100 when the current content being viewed changes 300. For example, when an input source changes (e.g., set-top box to internal receiver 102), or when a channel is changed (e.g., from public broadcasting channel to a movie channel) or when a program changes (e.g., the Disney show is over and an R-rated movie begins). When the content changes 300, the rating of the new content (e.g., new television channel or new movie in an external disk player) is determined 310 and the rating is checked against the security setting 320. If the security setting and content rating are satisfactory 330, nothing is done. If the security setting and content rating are not satisfactory 330, then an action is taken 340 such as disabling the new input, preventing the channel selection, blanking the video and/or audio, etc.

Figure 7:
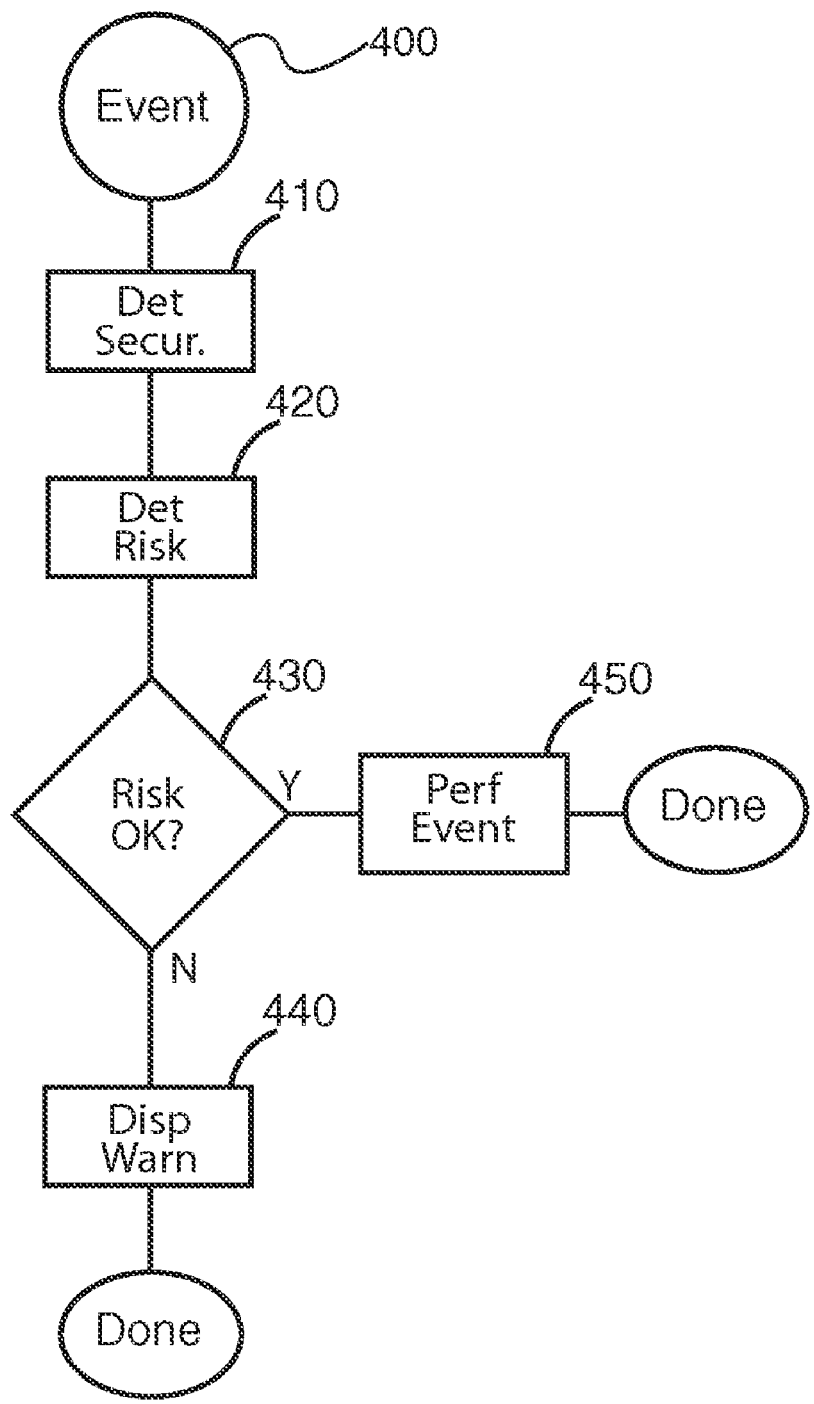
FIG. 7 illustrates a fifth flow chart.

Referring to FIG. 7, a fifth flow chart will be described. This is an exemplary program flow executed within the processing element 100 when an event occurs 400 such as the television 5 is turned on, a new device is interfaced with the television 5, a time of day, etc. When the event occurs, the current security level is determined 410 (e.g., TV-G viewers are present) and the risk of the event is evaluated 420 (e.g., after a certain time, a certain channel sometimes has content unsuitable for TV-G viewers). If the risk is low 430, then the event is performed 450 (e.g., if the selected channel only has TV-G content or if it is before 10 PM and the selected channel doesn't offer unsuitable content before that time). For example, if the new channel has G-rated content and the audience includes only G-rated or higher viewers, the channel is changed. If the risk is high 430, then the event is not performed and instead, a warning is issued 440 (e.g., a temporary message is displayed on the display panel 12 such as "cannot access this channel at this time").

Figure 8:
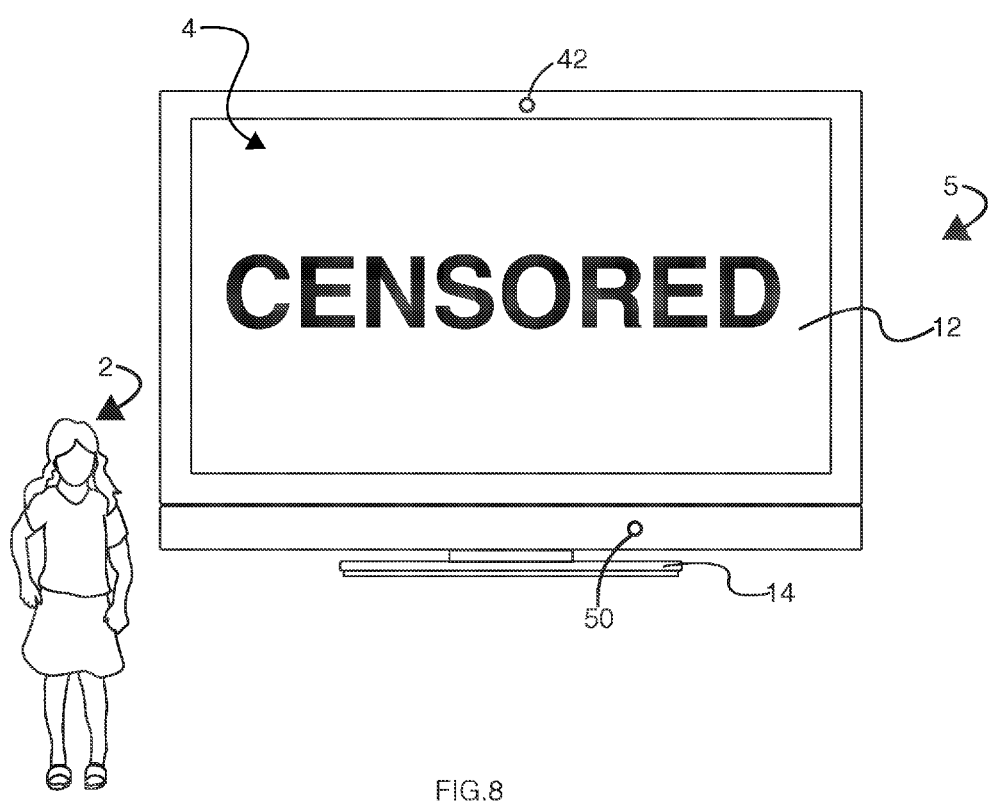
FIG. 8 illustrates a plan view of a typical on-screen display.

Referring to FIG. 8, a plan view of a first typical on-screen display will be described. Many user interfaces are known in the industry and the user interface of FIG. 7 is but one example. In this, adult content is being displayed on the display panel 12 and a young viewer 2 has entered the viewing area. Once the television system 5 determines that the new viewer is too young for the current content, either by image recognition through the camera 42, by voice recognition through the microphone 50, or by both, the content is changed, blocked, filtered or blanked 4, etc., thereby preventing the viewing of such content by the young viewer 2.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for monitoring viewers of a television, the system comprising:
   a display panel;
   a processing element operatively coupled to the display panel;
   a plurality of records, each record associated with a viewer and each record comprising a viewer identity and a viewer category;
   a viewer sensing device operatively coupled to the processing element, and operating to electronically sense multiple viewers at a time who are viewing said television; and
   software running on the processing element, the software detects said multiple viewers within a viewing area of the television, determining identities of said multiple viewers, and, using the identities of said multiple viewers, determining viewing limits associated with the multiple users and determining a most restrictive limit on viewing content for a most restrictive limit among the viewers, and providing content only for the most restrictive limit among the viewers.

2. The system for monitoring viewers of claim 1, wherein the viewer sensing device is an image sensing device and the viewer identities comprises an image of the viewer.

3. The system for monitoring viewers of claim 1, wherein the viewer sensing device is an audio sensing device and the viewer identities comprises an audio sample of the viewer.

4. The system for monitoring viewers of claim 1, wherein the viewer category is based upon ages of the viewer, and a lowest age among the viewers is used to set a presentation.

5. The system for monitoring viewers of claim 1, wherein the viewer category is based upon a preference of the viewers.

6. The system for monitoring viewers of claim 1, wherein the viewer category is based upon a time limit associated with the viewers.

7. The system for monitoring viewers of claim 1, wherein the software running on the processing element consults with a remote server to detect the multiple viewers within a viewing area of the television.

8. A system for monitoring viewers of a television, the system comprising:
   a display panel;
   a processing element operatively coupled to the display panel;
   a plurality of records, each record associated with a viewer and each record comprising a viewer identity and a viewer time value representing an amount of time that the viewer is allowed to view the television;
   a viewer sensing device operatively coupled to the processing element, and operating to electronically sense multiple viewers at a time who are viewing said television; and
   software running on the processing element, the software detects an identity of said multiple viewers within a viewing area of the television and using the identity of said multiple viewers, determining viewing limits associated with the multiple users based on said viewer time value, and determining a most restrictive limit on viewing content for a most restrictive limit among the viewers, and providing content only for the most restrictive time limit among the viewers identity of the viewer, the software provides content to the display panel and operates to terminate the currently playing programs when any of the viewers have violated their limit even when other viewers have not violated their limit.

9. The system for monitoring viewers of claim 8, wherein the viewer sensing device is an image sensing device and the viewer identity comprises images of the viewers.

10. The system for monitoring viewers of claim 8, wherein the limit on viewing content is a limit on a number of hours in one week.

11. The system for monitoring viewers of claim 8, wherein the viewer time value is a set of allowable viewing times associated with the viewers.

12. A method of monitoring viewers of a television, the method comprising: providing a plurality of records, each record associated with a viewer and each record comprising a viewer identity and a viewer category;
    electronically detecting multiple viewers at a time who are viewing said television, and detecting identities of said multiple viewers;
    using the identity of said multiple viewers, determining a most restrictive limit on viewing content for the most restrictive limit among the viewers, and providing content only for the most restrictive limit among the viewers and determining if a current content being provided by the television is appropriate for the viewer with the most restrictive limit;
    if the current content being provided by the television is not appropriate for the viewer with the most restrictive limit, disabling the current content being provided by the television.

13. The method of claim 12, wherein the step of detecting includes capturing an image of the viewing area and using facial recognition to compare faces within the image with viewer image data within each viewer identity.

14. The method of claim 12, wherein the step of detecting includes capturing voice prints from the viewing area and using vocal recognition to compare voices within the voice prints with viewer voice print data within each viewer identity.

15. The method of claim 12, wherein the viewer category is based upon an age of the viewers.

16. The method of claim 12, wherein the viewer category is based upon a preference of the viewers.

17. The method of claim 12, further comprising the step of creating the plurality of records before the step of detecting.

18. The method of claim 17, wherein the step of creating the plurality of records includes presenting an on-screen display and for each added viewer: capturing an image of the added viewer as the viewer identity and capturing the viewer category of the added viewer.

19. The method of claim 17, wherein the step of creating the plurality of records includes presenting an on-screen display and for each added viewer: capturing an audio sample from the added viewer as the viewer identity and capturing the viewer category of the added viewer.

20. A method of monitoring viewers of a television, the method comprising: (a) providing a record associated with a viewer comprising a viewer identity, a viewer time limit and a viewer total time;
    (b) electronically detecting multiple viewers at a time who are viewing said television, and detecting identities of said multiple viewers;
    (c) recording a time of the detecting;
    (d) determining an elapsed viewing time by subtracting a current time from the time of the detecting;
    (e) adding the elapsed viewing time to a previous viewer total time, and determining if the previous viewer total time exceeds the viewer time limit for any of the plurality of viewers, and disabling current content being provided by the television if the elapsed viewing time exceeds said viewer total time for said any of said plurality of viewers;
    (f) if the viewer is still within the viewing area of the television, continuing with step e;
    (g) if the viewer is not still within the viewing area of the television, creating a new total time by adding the viewer total time to the elapsed time for a new viewer and saving the new total time into a viewer total time for the new viewer.

21. The method of claim 20, wherein the step of detecting includes capturing an image of the viewing area and using facial recognition to compare faces within the image with viewer image data within the viewer identity.

22. The method of claim 20, wherein the step of disabling includes changing a state of the television to standby.

23. The method of claim 20, wherein the step of disabling includes displaying a message on the television and preventing displaying of content.

24. The method of claim 20, wherein the step of disabling includes playing a voice message and preventing displaying of content.

25. The system of claim 6, wherein said processing element operates software to determine multiple different time limits associated with multiple different viewers, and operates to terminate the currently playing program automatically when any of the viewers have exceeded their time limit even when other viewers have not exceeded their time limit.

* * * * *